Dec. 6, 1960 J. J. SURAN ET AL 2,963,593

CROSS-COUPLED MULTIVIBRATOR SELECTIVELY OPERABLE EITHER MONOSTABLY OR BISTABLY

Filed Feb. 21, 1957

INVENTORS:
JEROME J. SURAN,
FREDERICK A. REIBERT,

BY Robert J. Steinmeyer
THEIR ATTORNEY.

2,963,593
Patented Dec. 6, 1960

2,963,593

CROSS-COUPLED MULTIVIBRATOR SELECTIVELY OPERABLE EITHER MONOSTABLY OR BISTABLY

Jerome J. Suran, Syracuse, and Frederick A. Reibert, North Syracuse, N.Y., assignors to General Electric Company, a corporation of New York Filed Feb. 21, 1957, Ser. No. 641,631
4 Claims. (Cl. 307—88.5)

This invention relates to semiconductor multivibrator circuits and more particularly to multivibrator circuits having interchangeable bistable and monostable states.

Semiconductor multivibrator circuits are well known in the art. These circuits may be either bistable or monostable in nature. Conventionally, a circuit is made monostable by employing a single cross-coupling capacitor or network rather than two cross-coupling networks between the bases and collectors of opposite devices within a single stage.

One persistent problem has been that of designing a multivibrator circuit which will automatically return a stage to a given reference state in the event of power line interruptions or in an application where pulse width discrimination is desired to prevent accidental triggering of a stage by noise pulses. Another problem exists in converting the division ratio or binary countdown factor of a chain of multivibrator circuits by the use of a digital input which will be capable of selecting a given divisor. It is therefore an object of this invention to provide a multivibrator circuit which may be made selectively monostable or bistable.

Another object of this invention is to provide a multivibrator circuit which may be statically bistable but monostable to an impulse of short duration.

A more specific object of this invention is to provide a semiconductor multivibrator circuit which may be connected in a chain of stages, each stage of which may be made selectively monostable or bistable in accordance with an input which is designed to select a given divisor for a division operation.

Briefly stated, in accordance with one aspect of our invention, we provide a conventional bistable transistor multivibrator employing two transistors with controllable means for inserting an additional impedance in the emitter circuit of one of the transistors in order to so modify its load line that the multivibrator may be selectively made monostable.

Figure 1:
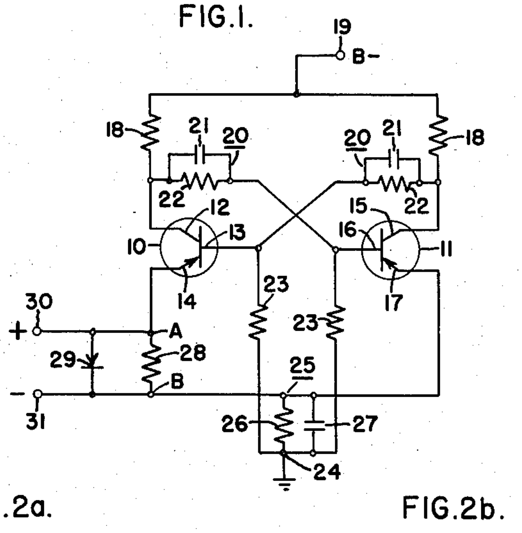
Figure 2A:
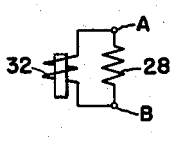
Figure 2B:
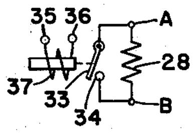
Figure 3:
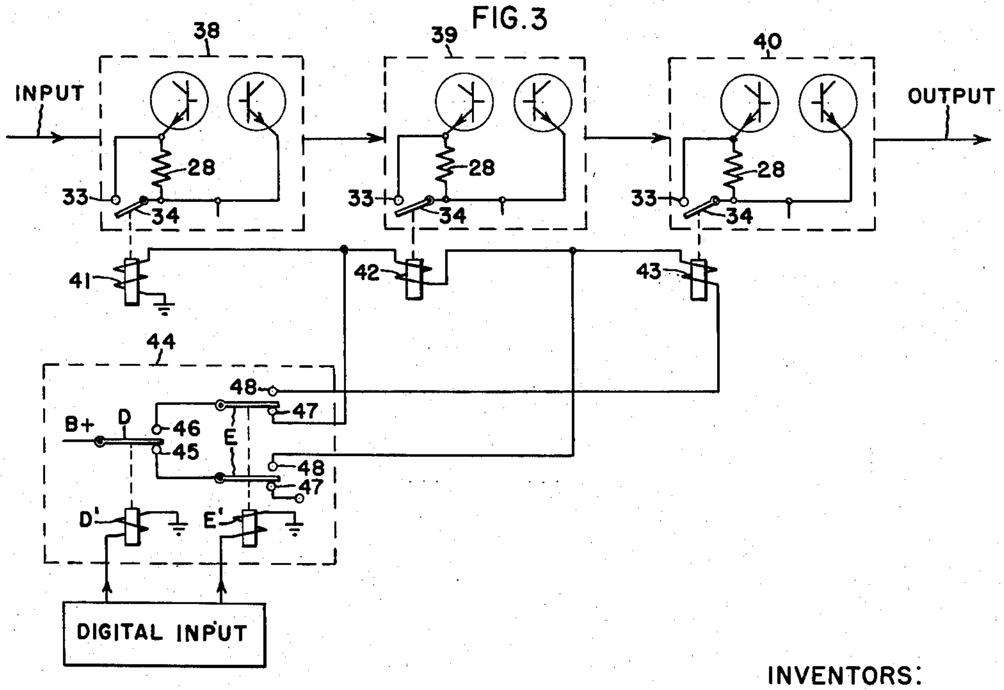

The novel features which we believe to be characteristic of our invention are set forth with particularity in the appended claims. Our invention itself, however, together with further objects and advantages thereof, can best be understood by reference to the following description taken in connection with the accompanying drawing in which Fig. 1 illustrates a semiconductor multivibrator circuit which may be made monostable or bistable at will; Figs. 2*a* and 2*b* illustrate two circuits which may be alternatively connected between the terminals A and B of Fig. 1 and used to obtain monostability or bistability; and Fig. 3 illustrates a chain of multivibrator circuits of which certain combinations may be made monostable or bistable as desired in order to effect a given divisor in a mathematical operation.

Referring now to the drawing, in Fig. 1 we have illustrated a multivibrator circuit employing two PNP transistors 10 and 11, transistor 10 having collector electrode 12, base electrode 13 and emitter electrode 14, and transistor 11 having collector electrode 15, base electrode 16 and emitter electrode 17. Transistors 10 and 11 are connected as follows: collector electrodes 12 and 15 are each connected to a collector load impedance or collector biasing resistor 18 which is in turn connected to a common terminal 19. Transistors 10 and 11 are cross-coupled through impedances 20 which are shown as parallel combinations of a capacitor 21 and a resistor 22 that are connected, respectively between collector electrode 12 and base electrode 16 and between collector electrode 15 and base electrode 13. Base biasing impedances 23 are connected to base electrodes 13 and 16 and thence to a common terminal 24. A source of D.C. potential is connected across terminals 19 and 24 with terminal 24 grounded and the negative pole (B−) applied to terminal 19. An emitter biasing impedance 25, consisting of a parallel combination of a resistor 26 and a capacitor 27, is connected between emitter electrode 17 and common terminal 24. An additional emitter biasing impedance 28 is connected from emitter electrode 14 through emitter biasing impedance 25 to terminal 24. A switching means, shown illustratively as a semiconductor diode 29, is connected in parallel with the additional emitter biasing impedance 28 at terminals A and B. Terminals 30 and 31 are connected on opposite sides of diode 29 for applying a gating or switching pulse thereto.

The operation of the circuit of Fig. 1 is as follows: considering the terminals A and B to be short-circuited or connected together, the circuit of Fig. 1 operates as any conventional semiconductor multivibrator circuit operating in a bistable mode. If a signal were applied at point A, for example to cause transistor 10 to conduct, the change in potential at collector 12 would be transmitted to base 16 cutting off transistor 11. Then if a pulse were applied to emitter 17 to trigger transistor 11 on, it would in turn transmit a pulse from collector 15 to base 13 cutting off transistor 10. This second trigger pulse could also be applied to point A and be of such a polarity as to cut off transistor 10 first whereupon the potential change at collector 12 would cause transistor 11 to conduct. If one of the transistors were biased so as to only be stable in the cutoff condition the circuit would become monostable since after the transistor with the single stable point of operation was triggered on, it would fire and return of its own accord to its cutoff state in turn causing the other transistor to conduct again.

Insertion of the additional emitter biasing impedance 28 between the terminals A and B changes the bias of the emitter electrode 14 and the resulting load line of transistor 10 in such a manner as to make this device operate in a monostable mode in which the single stable point of operation of transistor 10 is in the cutoff region. The diode 29, also connected across the terminals A and B, is biased by source B− in its reverse or nonconducting direction, thereby presenting a high impedance across terminals A and B. If a gating signal of sufficient magnitude is applied across terminals 30 and 31 with a positive polarity applied to terminal 30 and a negative polarity applied to terminal 31, as shown, the diode 29 will be gated into its conducting state and thus will present an extremely low impedance across the terminals A and B. This effectively short-circuits the additional emitter biasing impedance 28 and returns the multivibrator circuit to its bistable mode of operation. Thus, the presence or absence of the gating signal across terminals 30 and 31 can be utilized to switch the circuit of Fig. 1 back and forth between monostable and bistable conditions.

One set of practical values for the components of the circuit illustrated in Fig. 1 (including semiconductor types) is as follows:

| | |
|---|---|
| Transistors 10 and 11 | 2N43. |
| Resistors 18 | 8.2 thousand ohms. |
| Capacitors 21 | 50 micromicrofarads. |
| Resistors 22 | 51 thousand ohms. |
| Resistances 23 | 5,100 ohms. |
| Resistance 26 | 500 ohms. |
| Capacitor 27 | 1,000 micromicrofarads. |
| Resistor 28 | 1,000 ohms. |
| B— | 10 volts. |
| Diode 29 | HD 2085. |

In Fig. 2 we have illustrated two additional circuits for accomplishing the switching function between the monostable and bistable conditions in the circuit of Fig. 1. Fig. 2*a* illustrates a parallel combination of an inductor 32 and the additional emitter biasing impedance 28 connected in parallel across the two terminals A and B. This configuration may be connected across the terminals A and B of Fig. 1 and, when this is done, the normal state of operation for static or long time constant conditions of the circuit of Fig. 1 would be bistable since the inductor would present a short circuit across the additional emitter biasing impedance 28. However, for short duration impulses the impedance across the inductor 32 is high, effectively presenting an open circuit across the terminals A and B and re-inserting the additional emitter biasing impedance 28 into the circuit of Fig. 1, thereby making the resulting multivibrator circuit monostable. Thus, if a triggering pulse of short duration were applied at point A, the inductance of inductor 32 would remain high long enough to fail to short resistor 28 out of the emitter circuit and monostable operation would result. On the other hand, a longer pulse applied at point A would saturate the inductor 32 and short out resistor 28 resulting in bistable operation.

Fig. 2*b* schematically illustrates an additional switching means for the circuit of Fig. 1 in which additional emitter biasing impedance 28 can be connected in parallel across the terminals A and B by closure of moveable contact 33 against fixed contact 34 of a relay which is actuated by applying a signal to terminals 35 and 36 of coil 37. The mode of operation is again similar to those mentioned above. A signal applied across terminals 35 and 36 to close the relay will short-circuit terminals A and B, whereby the multivibrator circuit of Fig. 1 operates in its bistable mode. With the contacts 33 and 34 open-circuited the additional emitter biasing impedance 28 will cause the circuit of Fig. 1 to assume its monostable state of operation.

In Fig. 3 we have shown three stages of multivibrators 38, 39 and 40 connected in a chain configuration with an input supplied to stage 38 and an output taken from stage 40. This circuit may be used to divide by eight since eight input pulses are required to obtain an output pulse from stage 40. Each of the stages 38, 39 and 40 is illustrated as having the additional emitter biasing impedance 28 connected in the emitter circuit of the left-hand transistor and paralleled by contacts 33 and 34 such as are illustrated in Fig. 2*b*. The contacts 33 and 34 in stages 38, 39 and 40 are actuated by relay coils 41, 42 and 43 respectively. A relay tree 44 is designed to selectively activate relay coils 41, 42 and 43. The connection and operation of relay tree 44 is as follows: a source of voltage B+ is connected to a moveable arm D which is actuated by a coil D′ to contact either terminal 45 or terminal 46. Moveable ganged contacts E are both actuated by coil E′ to contact terminals 47 and 48. When relay arm D is contacting terminal 45 and relay arms E are each contacting terminal 47, the source of potential B+ is not connected to any of the coils 41, 42 or 43 and the resulting relay contacts are open, making the three stages 38, 39 and 40 monostable since the additional emitter biasing impedances 28 are connected in each of the emitter circuits. With this configuration a single input pulse yields a single output pulse and the input count is divided by one.

If moveable contact D is actuated by coil D′ to contact terminal 46 and moveable contacts E remain against terminals 47, current from the source of potential B+ is then permitted to flow through relay coil 41 to actuate its associated contacts 33 and 34 and remove the additional emitter biasing impedance 28 from stage 38. The stage 38 is now bistable but the stages 39 and 40 are monostable, the resulting effect being to divide the input pulses by two since two input pulses to the stage 38 are required to actuate the following monostable stages 39 and 40 and yield a single output pulse.

Now if the moveable contact D is returned to contact terminal 45 and if moveable contacts E are actuated by coil E′ to contact terminals 48, current from the source of B+ is connected to flow through both relay coils 41 and 42 to make both stages 38 and 39 bistable by shorting out their associated additional emitter biasing impedances 28. The resulting circuit divides by four in a manner similar to that mentioned previously. If the moveable contacts E are again returned to contact terminals 48 and moveable contact D are actuated by coil D′ to contact terminal 46, the source of B+ is connected through all three relay coils 41, 42 and 43, rendering all three stages 38, 39 and 40 bistable by shorting out their associated additional emitter biasing impedances 28. The resulting circuit divides by eight since all three stages are bistable in the manner of a conventional three stage, chain-connected multivibrator counter.

It will be obvious to anyone skilled in the art that our invention is readily adaptable to any circuit application which requires the transfer of a multivibrator stage between a monostable and a bistable state as has been described in the foregoing specification. Thus, while we have shown particular embodiments of our invention it will be understood of course, that we do not wish to be limited thereto since many modifications may be made and we therefore contemplate by the appended claims to cover any such modifications as fall within the true spirit and scope of our invention.

What we claim as new and desire to secure by Letters Patent of the United States is:

1. A semiconductor multivibrator circuit selectively operable in a monostable or bistable mode comprising two transistors each having a base, an emitter and a collector electrode; a source of direct potentials having two terminals, means coupling said collector electrodes and said base electrodes to said source, for energization of said transistors; two regenerative coupling resistances each connected between a base electrode of one of said transistors and the collector electrode of the other of said transistors to provide regenerative feedback between said transistors, emitter biasing means having one terminal connected to one terminal of said source and adapted when the other terminal thereof is connected to both of said emitter electrodes to provide bistable operation of said multivibrator, the other terminal of said emitter biasing means being connected to one of said emitter electrodes, and additional emitter biasing means coupled between the other terminal of said emitter impedance means and the other of said emitter electrodes capable of assuming a high or a low impedance condition with respect to the current flowing to said emitter electrode whereby said multivibrator circuit is made monostable or bistable in dependence on said condition.

2. The circuit set forth in claim 1 wherein said additional emitter biasing means comprises a time constant circuit exhibiting a time dependent impedance for discriminating between short and long duration triggering pulses.

3. The circuit set forth in claim 1 wherein said additional emitter biasing means is a time constant circuit comprising an inductor and a resistor in parallel.

4. The circuit set forth in claim 1 wherein said additional emitter biasing means includes a rectifier and means for controllably converting it to and from an easy flow condition with respect to the emitter current.

References Cited in the file of this patent

UNITED STATES PATENTS

| | | |
|---|---|---|
| 2,193,850 | Andrieu et al. | Mar. 19, 1940 |
| 2,406,096 | Morrison | Aug. 20, 1946 |
| 2,665,845 | Trent | Jan. 12, 1954 |
| 2,708,720 | Anderson | May 17, 1955 |
| 2,718,613 | Harris | Sept. 20, 1955 |
| 2,744,198 | Raisbeck | May 1, 1956 |

OTHER REFERENCES

Article: "A Semiconductor Diode Multivibrator," by Suran and Keonjian, Proceedings of the IRE, July 1955, pp. 814.